United States Patent Office
3,281,230
Patented Oct. 25, 1966

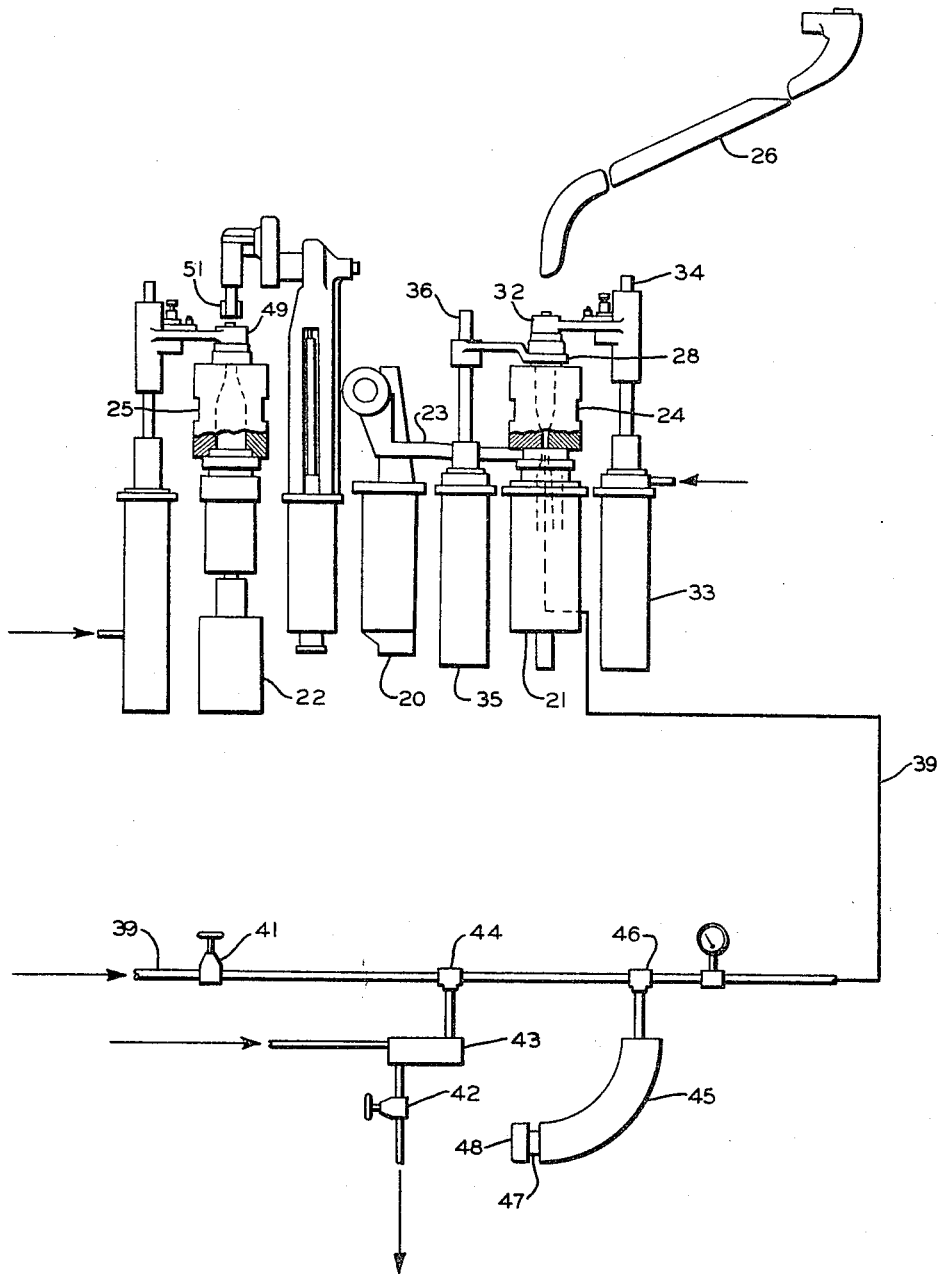

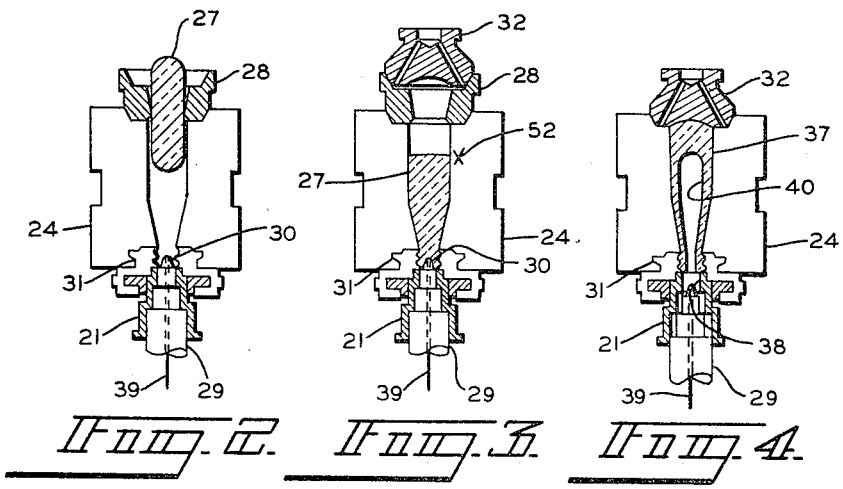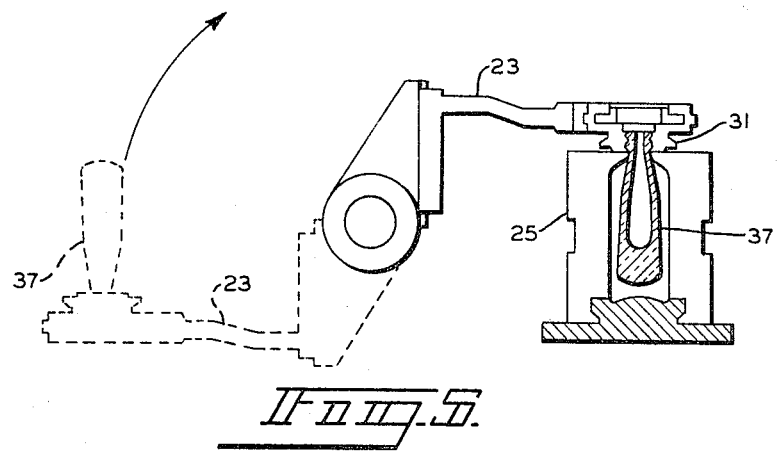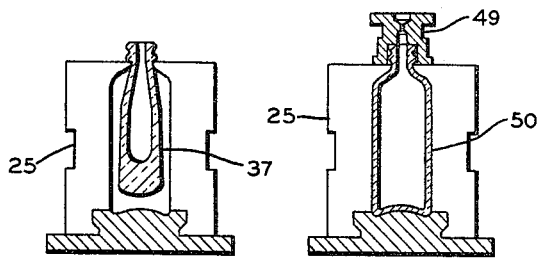

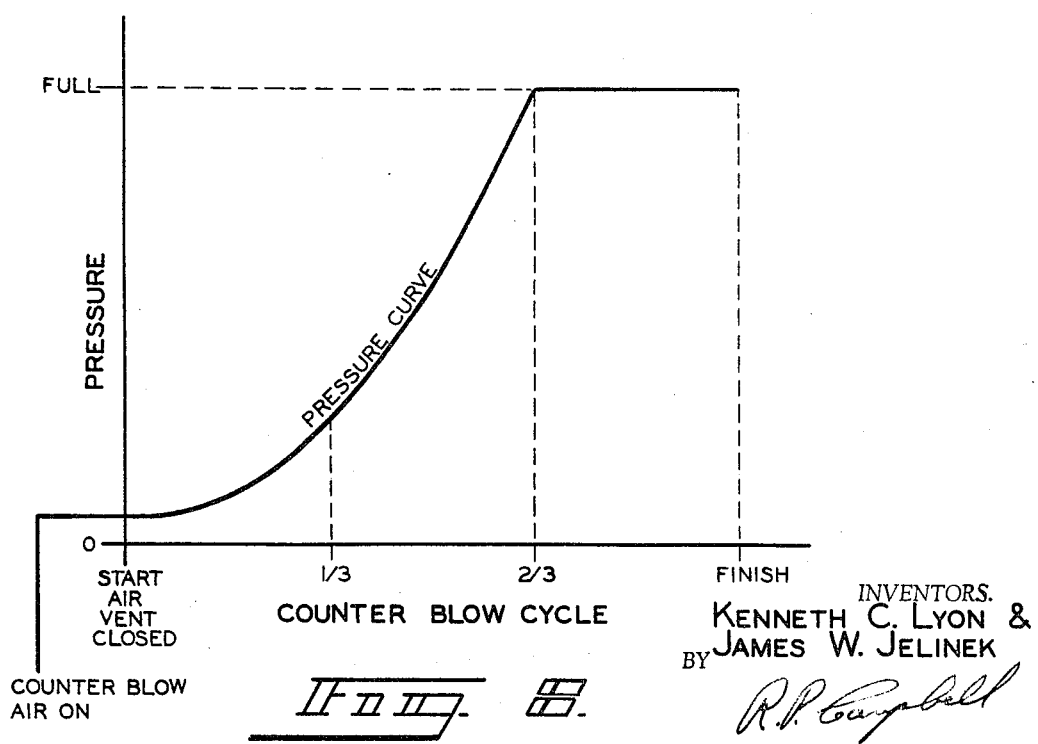

1

3,281,230
GLASS BLOWING MACHINE HAVING CONTROLLED BLOW PRESSURE
Kenneth C. Lyon, Dunkirk, and James W. Jelinek, Muncie, Ind., assignors to Ball Brothers Company Incorporated, Muncie, Ind., a corporation of Indiana
Continuation of application Ser. No. 182,419, Mar. 26, 1962. This application Aug. 23, 1965, Ser. No. 486,582
1 Claim. (Cl. 65—261)

This application constitutes a continuation of our copending application, Serial Number 182,419, filed March 26, 1962, entitled "Glass Blowing," now abandoned.

This invention relates to glass blowing, and more particularly, to the use of a reduced air pressure to initiate bubble formation in a plastic gob during an early portion of a blowing cycle and, later, a gradually increased and cushioned pressure to complete formation of a parison or finish bubble. In particular, the invention pertains to the use of a reduced or cushioned and reduced air pressure as soon as a plastic glass gob to be blown is seated in a mold relative to a blow head. This reduced air pressure initiates bubble formation early in the blowing cycle minimizing any static condition of the gob, and maintains the gob in a dynamic condition to eliminate and neutralize or counteract uneven or localized cooling of the glass. As a consequence, settle wave or increased side wall thickness in a particular portion of the finished vessel is obviated or significantly reduced.

In prior art glass blowing severe thermal differences occur even before initiation of bubble formation. In a Hartford Empire Individual Section machine, for example, a plastic glass charge or gob is fed through a funnel to a parison mold and then either pressed or blown into engagement with a finish-forming, lower mold portion. The gob then remains stagnant while various operations occur. During this time the uppermost outer surface of the glass is in contact with mold metal and is also adjacent to metal immediately above which does not contact the gob. As a consequence, this uppermost outer surface is cooled more rapidly than are other parts of the gob, and its viscosity is increased to a greater degree. When counter blow pressure is applied to form a parison or bottle from the gob, heavy sections of glass remain as a consequence of the higher viscosity. This condition is carried through the final blowing of the bottle, and is the well-known settle wave which is obviated or minimized according to the invention.

With the foregoing in view, the primary object of the invention is to provide an improved glass blowing method.

A further object of the invention is to provide such a method wherein counter blow air pressure to start parison formation is applied immediately after or simultaneously with termination of seating of a gob to maintain movement in the glass gob body and to prevent any static condition which would contribute to localized cooling.

Another object of the invention is to provide a cushioning apparatus in the counter blow equipment of a glass blowing machine.

Still a further object of the invention is to provide a cushioning apparatus in the counter blow equipment which insures gradual application of a low counter blow pressure to maintain movement of a glass gob body during a slow parison formation and then a gradual application of the full counter blow pressure to complete the parison.

Another object of the invention is to provide a blowing process wherein there is an initial low pressure blow before an open mold top is closed, and wherein the pressure is gradually increased after closing the mold top to one sufficiently high to complete formation of an interior cavity and to force the glass into intimate contact with the mold surface.

2

A further object of the invention is to initiate a cushioned bubble-forming blow earlier in a glass blowing cycle than any bubble-forming blow is normally applied in the prior art and thereby to obviate severe thermal differences which have heretofore occurred in the formation of a parison as a result of the glass becoming stagnant at various stages.

Another object of the invention is to avoid the abrupt formation of a blown bubble, and thereby to allow time for dynamic glass movement which redistributes the glass and neutralizes localized temperature variations.

These and other objects of the invention will be apparent by reference to the following description setting forth the elements of the invention in conjunction with the accompanying drawings illustrating the inventive method and apparatus wherein:

FIGURE 1 is a left side elevation view of pertinent glass machine elements and a counter blow cushioning apparatus and system;

FIGURE 2 is a cross sectional view of a parison mold portion of FIGURE 1 showing the mold receiving a gob through a funnel;

FIGURE 3 is a view similar to FIGURE 2 showing a settle blow head located on the funnel and the gob at the bottom of the mold;

FIGURE 4 is a view similar to FIGURES 2 and 3 showing the funnel removed, the settle blow head replaced and utilized as a baffle and a parison filling the mold;

FIGURE 5 is a right side view in elevation, and shows a transfer arm portion of the machine of FIGURE 1; the parison of FIGURE 4 is shown in the position of FIGURE 4 in dotted lines and repositioned in a final mold of FIGURE 6 in solid lines;

FIGURES 6 and 7 show a finish mold portion of the machine of FIGURE 1 and the completion of the glass container wherein FIGURE 7 shows the desired uniformity of side wall thickness; and FIGURE 8 is a graph showing the applied counter blow pressure as a gradually increasing curve.

In general, blowing of glass in a mold to develop even side wall thickness in such a final product as a bottle involves delivering a glass gob to the mold, forcing the gob downwardly into seated relationship with a neck forming area of the mold to insure proper neck formation and counter blow sealing. Upon seating in the mold the gob has several different local temperature regions including a first relatively hot central core area out of contact with the mold, a second relatively cooler side wall area in contact with the mold, and a third relatively still cooler extremity ring area. The third ring area contacts the mold in thermal communication with the cooling mass of the unfilled portion of the mold. These temperature differences cause viscosity differences, which in turn cause differences in flow characteristics, and side wall thickness differences are the ultimate consequence in the final product.

The method according to the invention provides for applying substantially immediately after seating of the gob, a relatively low or low and cushioned counter blow pressure with gradual build-up to initiate forming a bubble substantially immediately but relatively slowly. This immediate but slow bubble formation causes slow, dynamic movement of the gob body, particularly in the first hot core area. The slow movement causes mixing and relatively extended heat exchange from at least the first hot core area to the third still cooler extremity area. As a consequence, the temperature of the third area is increased, and the viscosity is correspondingly reduced to substantially the level of the second cooler side wall area.

The method according to the invention further provides for applying the relatively low or low and cushioned counter blow pressure during changes in mold setup, such as removal of a settle blow head and funnel and replacement of the settle blow head as a baffle. In this manner, the time during which the gob stands stagnant and consequent local temperature variations are kept to a minimum.

The instant method further includes maintaining gob body heat distributing motion by partially blowing the bubble before the mold is baffled with relatively low but gradually increased cushioned pressure to provide time and motion to achieve substantially uniform temperature and viscosity in the side wall area.

The method further includes gradually building up cushioned pressure after the mold is closed to full pressure to force the uniformly heated and viscous body into intimate mold contact with substantially uniform side wall thickness in the final product.

Referring now to the drawings wherein like numerals refer to like and corresponding parts throughout the several views, a glass vessel or bottle machine partially shown in FIGURE 1 has a center transfer mechanism 20, a parison forming side 21, and a finish forming side 22 with a center transfer arm 23 for transferring a parison from a parison mold 24 to a finish mold 25. A chute 26 conveys a glass gob 27, FIGURE 2, to the parison mold 24. The gob 27 falls through a funnel 28 and drops against a plunger 29, end 30 and into contact with neck forming mold portion 31, FIGURE 3. A settle blow head 32 is then superposed on the funnel 28 and settle blow air is delivered therethrough to seat the gob 27 relative to the mold portion 31.

The settle blow head 32 is then lifted by a cylinder 33 and a rod 34, FIGURE 1; the funnel 28 is removed by a cylinder 35 and a rod 36; and the settle blow head 32 is repositioned on the mold 24 to act as a baffle in forming a parison 37. At the same time the plunger 29 is retracted from the position of FIGURES 2 and 3 to that of FIGURE 4, creating a chamber 38 below the mold 24 and parison 37 into which a line 39 feeds counter blow air under pressure to blow a parison bubble 40.

Referring again to FIGURE 1, a first needle valve 41 is disposed in the line 39 for throttling air flow, a second needle valve 42 leading to atmosphere is connected through a normally open air operated shutoff valve 43 to the line 39 via a fitting 44 for bleeding off initially applied pressure, and a cushion chamber tank 45 is connected to the line 39 via a fitting 46 to provide an air head cushioning the initially applied counter blow pressure for forming the parison bubble 40.

The air cushion tank 45 may be accurate to dissipate velocity impact and back wave surge and is equipped with a nipple 47 and a removable cap 48 for adding additional air cushion tanks or cylinders as desired.

After the parison 37 is formed in the parison mold 24, FIGURE 4, the transfer arm 23, FIGURE 5, moves the parison 37 from the dotted line position of FIGURE 5, corresponding to FIGURE 4, to the solid line position of FIGURES 5 and 6, stationed in the finish mold 25 during which operation reheat of the parison 37 is accomplished. A final blow head 49 finishes blowing the parison 37 to the finished bottle 50 which is removed from the machine via a clamp 51.

In the preferred embodiment of the invention, several steps and operations occur immediately, at an advanced point, or contemporaneously, which heretofore in the prior art were performed after a dwell period or sequentially; by performing these steps and operations at the same time the invention obviates the time lag, gob static condition, and consequent accelerated cooling in localized areas of the gob. The gob is maintained in a dynamic moving condition by application of reduced or reduced and cushioned counter blow pressure applied substantially immediately after the applied settle blow pressure portion of the cycle. Under these conditions the body of the gob is kept moving, dynamic, or stirred and therefore not permitted to stand and become static, or stagnant. This prevents a portion of the gob from being subject to a local increased cooling condition, thereby maintaining the gob body at uniform temperature.

More particularly, just after the settle blow, FIGURE 3, and as soon as the finish sets sufficiently, the plunger 29 is retracted to the position of FIGURE 4, and the counter blow pressure from the line 39 is applied to the chamber 38 to initiate formation of the parison bubble 40 immediately after or even prior to the removal of the settle blow head 32 and funnel 28. This counter blow pressure is gradually applied in increased pressure and volume, although initially reduced and cushioned, while the settle blow head 32 is retracted, the funnel 28 removed, and the settle blow head 32 repositioned on the mold 24, FIGURE 4, as a baffle for the complete formation of the parison 37.

Because the cushioning effect of the cushion tank 45 can only absorb and cushion so much, and also because the cushion is more pressure absorbent at the initiation of counter blow pressure than during its later application, the initial pressure application to start the parison bubble formation is highly cushioned.

Air in the line 39 on the downstream side of the main needle valve 41 is initially bled to atmosphere via the needle valve 42, so that applied pressure is partly dissipated at the same time it is being cushioned. When the settle blow head 32 is reseated as a baffle, the air operated valve 43 blocks bleeding through the needle valve 42, and pressure rises in the line 39 but subject to cushioning by the chamber 45 until equalization occurs in the line 39.

By bleeding counter blow pressure via the needle valve 42 and cushioning same by the chamber tank 45, the counter blow air pressure can be applied through the line 39 against the parison far ahead of prior art cycling, and the bubble 40 growth, although slow, moves the glass at the coolest portion 52, FIGURE 3, of the mold 24, preventing localized cooling in the glass body. Upon closing of the vent or needle valve 42, the cushion chamber tank 45 absorbs applied pressure from the vented level facilitating gradually accelerating movement in the glass body, or dynamic body action to redistribute localized temperature variations to uniformity.

FIGURE 8 illustrates the above described conditions and shows that an initial low pressure is applied until the air vent is closed, and that thereafter there is a gradual increase to a full applied pressure. It is apparent that the body of glass has been kept in motion and has not been standing in a static condition. As a consequence, localized cooling, which would cause the prior art settle wave deformation in the side wall of glass bodies, has been avoided.

Referring to FIGURE 7, it is to be noted that the side wall of the glass vessel made by the instant means and process is substantially uniform and devoid of the side wall settle wave increase thickness deformation.

It is within the purview and scope of the invention to use the cushion chamber tank 45 singly or in multiple with other like tanks, with same cushioning singly or in combination with needle valve bleeding as is disclosed and described.

Adjustable and variable apparatus has been disclosed to facilitate the application of the inventive apparatus and system to various size containers and bottles to obviate the formation of the settle wave increased thickness in their side walls. Due to the large range in size of glass containers made in this manner, it has been found necessary to provide adaptable equipment so that a wide range of cushioning and throttling can be furnished during the period from the settle blow application to the full counter blow parison formation. Under most conditions the total counter blow time, according to the invention, ranges from about 0.8 second to about 3 seconds, and the maximum pressure is from about 15 to about 40 pounds per square inch gauge.

The method and means of the invention have been described using the "blow-and-blow" technique of glass container manufacture, however, it is to be understood that the method and means of the invention apply equally to other techniques of glass container manufacture.

While only a single embodiment of the invention device and system has been disclosed and described in detail, it is obvious that many changes may be made in the size, shape, detail, and arrangement of the various elements of the invention and system within the scope of the appended claim.

What is claimed is:

Apparatus for manufacturing hollow glass articles having substantially uniform side wall thickness and a neck, said apparatus comprising: a mold for receiving a glass gob, said mold having a neck-forming portion; settle blow means for applying a settle force to seat the gob in said neck-forming portion of said mold, said gob having several different local temperature variations including a first relatively hot central core area out of contact with the mold, a second relatively cooler side wall area in contact with the mold, and a relatively still cooler extremity ring area contacting the mold in thermal communication with the cooling mass of the unfilled portion of the mold; and counter blow means including a line leading from a relatively high pressure fluid source to said mold, valve means connected to said line to divert fluid from said line, control means connected to said valve means to control the amount of fluid directed from said line, and a cushion chamber connected to said line between said mold and the connection of said valve means to said line so that a relatively low, gradually increasing counter blow pressure is provided to said mold to substantially immediately but relatively slowly start forming a bubble in the gob to cause slow displacement but dynamic movement in the gob body and particularly in the first hot core area, said dynamic movement causing heat to be exchanged from at least said first hot core area to said third still cooler extremity ring area and thereby increase the temperature and lower the viscosity of the same to a level substantially corresponding with said cooler side wall area temperature and viscosity level, said counter blow means causing the counter blow pressure at said mold to gradually build to said relatively high pressure level to force said substantialy uniformly heated gob body into intimate mold contact with substantially uniform side wall thickness.

References Cited by the Examiner

UNITED STATES PATENTS

| | | | |
|---|---|---|---|
| 962,355 | 6/1910 | Johnson | 138—26 X |
| 1,790,659 | 2/1931 | Gillen et al. | 138—30 |
| 1,803,001 | 4/1931 | Canfield | 65—77 |
| 1,865,486 | 7/1932 | Seymour et al. | 138—26 X |
| 2,142,954 | 1/1939 | Rowe | 65—76 |
| 2,142,955 | 1/1939 | Rowe | 65—76 |
| 2,251,010 | 7/1941 | Allen | 65—263 |
| 2,273,777 | 2/1942 | Berthold | 65—76 |

DONALL H. SYLVESTER, *Primary Examiner.*

F. W. MIGA, *Assistant Examiner.*